United States Patent [19]
Brown

[11] 3,880,278
[45] Apr. 29, 1975

[54] CARRYING CASE AND CARTRIDGE FOR CONTACT LENSES

[76] Inventor: Frank E. Brown, 1842 Emerald Ter., Glendale, Calif. 91201

[22] Filed: Oct. 18, 1973

[21] Appl. No.: 407,543

[52] U.S. Cl. .................. 206/5.1; 206/205; 134/137
[51] Int. Cl. ............................................. A45c 11/04
[58] Field of Search .............. 206/5.1, 205; 134/137

[56] References Cited
UNITED STATES PATENTS
3,822,780   7/1974   Ulmer et al. .................... 206/205 X Primary Examiner—George T. Hall
Attorney, Agent, or Firm—Christie, Parker & Hale

[57] ABSTRACT

A fluid-tight carrying case of narrow profile allows contact lenses to be conveniently carried when not being worn. The lenses are placed in a narrow-profile cartridge which includes a pair of side-by-side lens containing receptacles arranged to hold the lenses in a common plane. The cartridge is removably disposed in the carrying case for immersing the lenses completely in a suitable liquid solution contained in the case.

24 Claims, 7 Drawing Figures

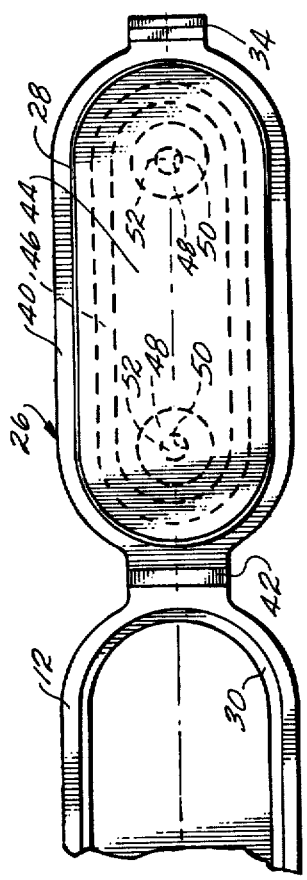
Fig. 5
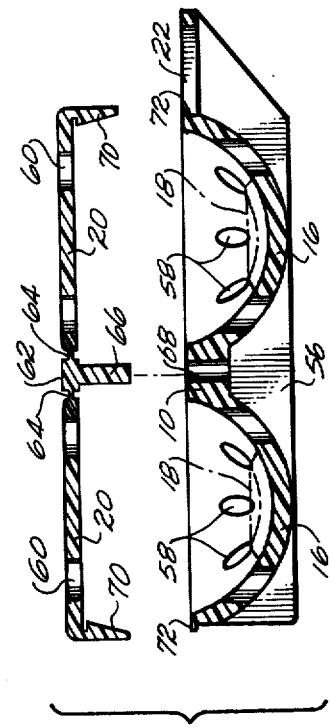
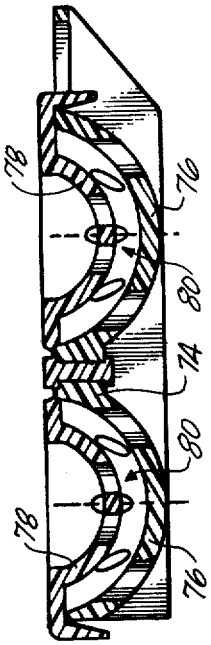
Fig. 6  Fig. 7
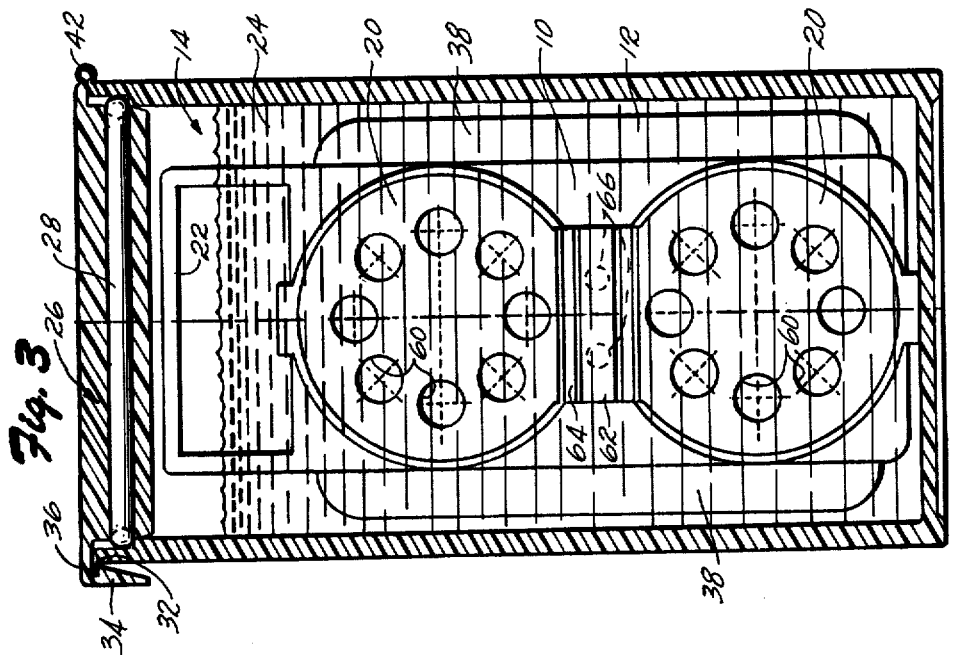
Fig. 3  Fig. 4

3,880,278

CARRYING CASE AND CARTRIDGE FOR CONTACT LENSES

BACKGROUND

This invention relates to contact lens carrying cases of the type which hold the lenses in a liquid solution while they are stored in the case.

In the past, there have been various types of carrying cases for contact lenses. The most important of these is the type which allows the lenses to be completely immersed in a liquid solution contained in the carrying case while the lenses are not being worn.

Generally, contact lenses which are not being worn should be stored in a liquid solution containing mild detergents for removing contaminants such as mucous, residue, film, and the like so the lenses can be cleaned before they are placed back into the user's eyes. The lenses should be completely immersed in such a liquid solution to wet the entire surface area of lenses, because lenses which are too dry should not be worn. For instance, the plastic material from which contact lenses are made will absorb moisture. If dry lenses are inserted in the eyes of the user, the lenses may absorb fluids from his eyes, which could cause eye irritation, and in some instances do permanent damage to the eyes. As a consequence, persons wearing contact lenses are cautioned by their doctors to store their lenses in a liquid solution when the lenses are not being worn.

Recently, a variety of cases for storing contact lenses in lens cleaning solutions have been developed. For example, a typical prior art carrying case includes a cylindrical-shaped outer container for holding a quantity of lens cleaning solution, and a cylindrical lens-holding device carried in the outer container. A major disadvantage of such carrying cases is that they are rather large or bulky, and therefore they are often inconvenient for people to carry them in their possession at all times. As a consequence, such carrying cases are mostly used by women or girls who can conveniently carry such cases in their purses. However, such carrying cases generally are not used by men or boys who wear contact lenses, because the bulky shape of the carrying cases makes them inconvenient for carrying in a shirt or pants pocket, for example.

SUMMARY

This invention provides a combination carrying case and cartridge of narrow profile which allow contact lenses to be conveniently carried about when not being worn.

Briefly, the lens carrying case has a hollow interior of narrow profile for receiving a lens-carrying cartridge. Preferably, the cartridge is separable from the case so it can be removably disposed in the case for completely immersing the lenses in a liquid solution contained in the case. The cartridge includes receptacle means for holding a pair of contact lenses to be stored in the case. The receptacle means are arranged on the cartridge so that the contact lenses are held in a plane which extends generally parallel to the long dimension of the carrying case when the cartridge is disposed in the case.

In a preferred form of the invention, the receptacle means of the cartridge hold the lenses in a generally common plane. Thus, the cross-sectional shape of the cartridge is of narrow profile, which allows the cartridge to be carried in the narrow-profile case, thereby providing means for conveniently carrying the lenses when they are being immersed in a liquid lens cleaning solution contained in the case.

These and other aspects of the invention will be more fully understood by referring to the following detailed description and the accompanying drawings.

DRAWINGS

FIG. 3 is a cross-sectional elevation view showing the lens-carrying cartridge mounted in the carrying case for immersing the contact lenses in a quantity of liquid lens-cleaning solution contained in the case;

FIG. 4 is an enlarged fragmentary cross-sectional elevation view showing means for providing a fluid-tight seal for the lid of the carrying case;

FIG. 5 is a fragmentary plan view taken on line 5—5 of FIG. 1 and showing the detailed construction of the lid for the carrying case;

FIG. 6 is an exploded cross-sectional elevation view showing the detailed construction of the lens-carrying cartridge; and FIG. 7 is a cross-sectional elevation view showing an alternate embodiment of the lens-carrying cartridge.

DESCRIPTION

Figure 1:
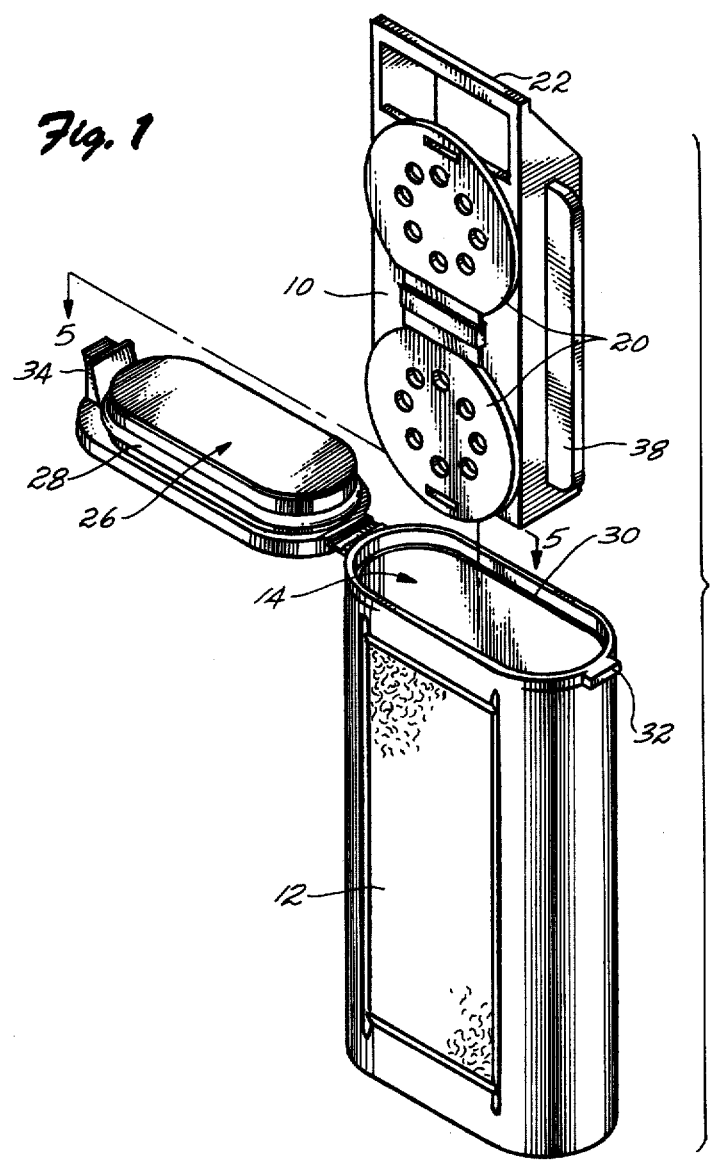
FIG. 1 is an exploded perspective view showing a combination carrying case and lens-carrying cartridge in accordance with this invention.

FIG. 1 shows a combination lens-carrying cartridge 10 and cartridge carrying case 12 according to this invention. Carrying case 12 is of narrow profile, having a generally oblong cross-sectional configuration. Preferably, the opposite sides of the case are planar and parallel to each other, rather than the case being truly elliptical, so that the case will be relatively narrow and flat. Thus, the carrying case provides a narrow hollow interior area 14 for receiving cartridge 10. Preferably, the cartridge is separable from the carrying case so it can be removably disposed in the interior of the case.

Figure 2:
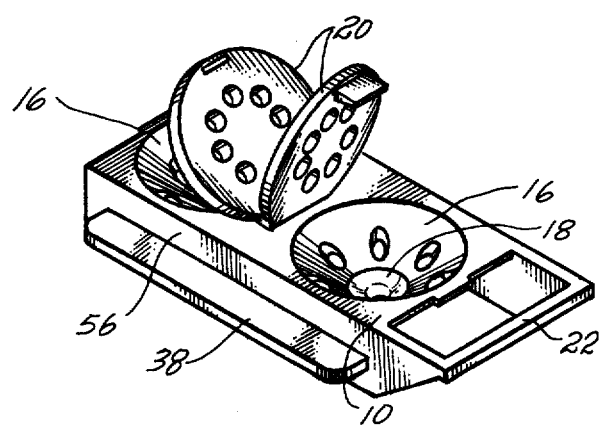
FIG. 2 is a perspective view showing the cartridge of FIG. 1 carrying a pair of contact lenses.

As shown best in FIGS. 1 and 2, cartridge 10 is shaped generally as a "sled" and includes a pair of side-by-side recessed areas 16 providing basket-shaped receptacles for holding individual contact lenses 18. Cartridge 10 also includes a pair of side-by-side hinged closure lids 20 to be releasably snapped into locking engagement with opposite ends of the cartridge to provide closed receptacles for holding lenses 18 in place when the cartridge is inserted in the carrying case. One end of the cartridge is shaped as a handle 22 to provide means for grasping the cartridge either when it is being inserted in or removed from the carrying case.

As shown best in FIG. 3, the cartridge holds both contact lenses completely immersed in a quantity of a liquid 24 contained in the case for cleaning the lenses as they are being stored in the case. An oblong-shaped lid 26 hinged to one end of the case closes the opening in the top of the case. The bottom of the lid carries an oblong-shaped seal ring 28 which is seated on a shoulder 30 extending around the interior of the case to provide a fluid-tight seal when the lid is closed.

An outwardly projecting lip 32 is formed on the end of the case opposite the end where lid 26 is hinged. A downwardly projecting tongue 34 is formed on the free end of lid 26. A groove 36 is formed in the inner edge of the tongue to allow the tongue to be releasably snapped into engagement with lip 32 for holding lid 26 in a closed, fluid-tight position over the opening in case 12.

Preferably, carrying case 12 and cartridge 10 both taper slightly wider toward their top ends. Moreover, cartridge 10 includes a pair of opposed, outwardly projecting elongated guide members 38 formed on opposite sides of the cartridge. The guide members taper wider toward the top of the cartridge to match the tapered contour of the interior of the case. The guide members provide means for guiding the cartridge into the interior of the carrying case. The taper of the guide members also prevents the cartridge from being placed in the carrying case in an up-side-down orientation.

The detailed construction of carrying case 12 is understood best by referring to FIGS. 4 and 5. Preferably, the case 12 is made from a a rugged plastic material such as polypropylene. Lid 26 preferably is fabricated from two separate pieces which are later joined together to make the finished lid construction. The lid is comprised of an oblong top portion 40 which is connected to the edge of the case by a "living hinge" 42. An oblong bottom portion 44 of the lid is molded separately and later joined to top portion 40.

The top portion of the lid includes a narrow downwardly projecting rim 46 of oblong shape formed integrally with the undersurface thereof. A pair of longitudinally spaced apart and downwardly projecting annular projections 48 are also formed integrally with the undersurface of the lid top portion. The two annular projections are located within the confines of narrow rim 46. Each annular projection 48 provides a separate pin alignment hole 50, the purpose of which will be described below.

The bottom portion of the lid comprises an oblong plate having a pair of longitudinally spaced apart, upwardly projecting alignment pins 52 formed integrally with its top surface. The alignment pins are spaced apart so they can be received in alignment holes 50. During fabrication of lid 26, alignment pins 52 are sonically bonded to annular projections 48 to form a rigid one-piece lid structure.

In the finished lid structure, the outer surface of rim 46 is recessed relative to retainer plate 44 to form an oblong groove 54 extending around the lid. Groove 54 provides means for seating o-ring seal 28. Preferably, o-ring seal 28 is releasably seated in groove 54 so it can be easily removed and replaced for cleaning purposes. O-ring seal 28 preferably is made from a deformable gasket material such as rubber so that closing of the lid will squeeze the seal against shoulder 30 to provide a fluid-tight seal for retaining the liquid solution 24 within the confines of the carrying case.

The detailed construction of the lens carrying cartridge 10 is understood best by referring to FIG. 6. Preferably, the cartridge is of two-piece construction and is made from a plastic material such as polypropylene. Lids 20 are molded as a unit, and the body of the cartridge is molded separately from lids 20. The lids are later joined with the body of the cartridge during the fabrication process. The molded sled-type configuration of the cartridge body includes narrow, downwardly projecting, elongated runners 56 on opposite sides of the cartridge. Guide members 38 are formed integrally with the outer edges of runners 56. The spacing between the two runners is substantially greater than the width of the runners so that the cartridge body is of oblong cross-sectional configuration shaped to fit into the corresponding oblong-shaped interior of the carrying case.

The lens-carrying recessed areas 16 of the cartridge preferably are aligned longitudinally between the two runners on a longitudinal axis extending parallel to and along the centerline of the cartridge body. Each recessed area 16 preferably is of hemispherical shape and includes a series of suitably spaced apart perforations 58 arranged in any desired configuration around the recess to provide a pair of spaced apart "baskets" for holding the contact lenses. The perforations in each basket allow the liquid solution contained in the carrying case to fill the basket areas of the cartridge so that the lenses can be completely immersed in the liquid solution while they are being stored in the case.

Recessed areas 16 are arranged on the cartridge so that they lie in a common plane extending parallel to the long cross-sectional dimension of the cartridge. (Although the shape of the two recessed areas is not planar in the sense that a plane is considered to be flat, the two recessed areas are considered to be in the same plane in the sense that the tops and bottoms of the recessed areas lie in respective common planes.) Thus, when contact lenses 18 are placed in recessed areas 16, and the cartridge is placed in the carrying case, the two lenses are held in a generally common plane extending substantially parallel to the long cross-sectional dimension of the case interior. (The contact lenses are spherically curved and therefore their shape is not planar in the sense that a plane is flat, but the two lenses are considered to lie in the same general plane in the sense that the circular edges and the apexes of curvature of the two lenses lie in common parallel planes when the lenses are normally placed in the recessed areas of the cartridge.)

Referring to FIG. 6, the two lid portions 20 of the cartridge are molded as a separate integral piece to be attached to the body of the cartridge during the manufacturing process. The two lids 20 are molded into a flat, generally rounded configuration and are provided with a series of suitably arranged perforations 60. The two lids 20 are connected to opposite sides of a central lids retainer plate 62 by respective "living hinges" 64. A pair of downwardly projecting alignment pins 66 (also shown in dotted lines in FIG. 3) are formed on the undersurface of retainer plate 62. The two lids 20 are connected to the top of the cartridge body by extending alignment pins 66 through cooperating holes 68 formed in the body of the cartridge at the bridge between the two recessed areas 16. Preferably, alignment pins 66 are longer than the holes in which they are inserted so that the protruding bottom portions of the pins can be thermally bonded to the bottom of the cartridge body and thereby form the equivalent of plastic rivets for fastening the lids 20 to the cartridge. Lids 20 are closed by respective downwardly depending locking projections 70 formed integrally with the outer edges of the lids and adapted to be releasably snap-fitted into engagement with projecting shoulders 72 on opposite ends of the cartridge body.

Thus, the invention provides a fluid-tight carrying case of narrow profile for receiving a removable, narrow-profile cartridge which mounts a pair of contact lenses in an orientation which allows them to fit into the narrow-profile case and also which insures that the lenses will be completely immersed in a liquid lens-cleaning solution contained in the case. The cartridge is readily removable from the case so that the cartridge and the interior of the case can both be easily cleaned by hand. Moreover, since the cartridge is made from a plastic material having a specific gravity less than that of water, the cartridge is easily removed from the container because it tends to float out of the case when the lid is opened, allowing the handle portion 22 of the cartridge to be easily grasped by the user.

FIG. 7 shows an alternate cartridge 74 specifically designed for mounting soft-type contact lenses in carrying case 12. Briefly, soft-type contact lenses should be kept in their normally usable shape when not being worn. Cartridge 74 provides a controlled retention device for maintaining soft-type contact lenses in their spherically curved shape while being stored in the carrying case. Cartridge 74 includes a pair of longitudinally spaced apart, generally spherically curved recessed basket areas 76 substantially identical in shape and orientation to recessed areas 16 of cartridge 10. Each recessed basket area is closed by a respective lid 78 having a spherically curved recessed central section which projects down into the recessed area 76 to provide a pair of spherically curved annular cavities 80 for receiving the soft-type contact lenses. The recessed portions of the lids are spaced from recessed basket areas 76 such that the bottoms of the lids and the top surfaces of the basket areas will engage the soft-type contact lenses as they are being stored in the cartridge and resist any tendency of the lenses to deform while they are in the carrying case.

As an added feature of the invention, the removability of either type of cartridge from carrying case 12 allows the user to interchange between soft-type lenses and regular lenses simply by using different cartridges, either of which can be fitted into the carrying case.

I claim:

1. Apparatus for carrying contact lenses which are generally planar in shape, the apparatus comprising
   a fluid-tight carrying case having a hollow interior of elongated cross-sectional configuration defining a long dimension and s short dimension,
   a lens-carrying cartridge shaped to fit into the hollow interior of the carrying case, the cartridge being separable from the case to be removably disposed in the hollow interior thereof,
   the cartridge including receptacle means for containing said planar contact lenses to hold the lenses submerged in a fluid disposed in the interior of the case,
   the receptacle means being arranged on the cartridge so that the plane of each lens contained therein lies substantially parallel to the long dimension of the case when the cartridge is disposed in the interior of the case,
   the case including closure means, and a lid of elongated configuration hinged to an end of the case, the lid having an elongated seal and closure means thereon, the seal providing a fluid-tight closure for the top of the case when the two closure means are engaged.

2. Apparatus according to claim 1 in which the receptacle means comprise at least a pair of side-by-side lens-holding containers both being arranged on the cartridge so that the lenses contained therein lie in a substantially common plane.

3. Apparatus according to claim 2 in which the receptacle means further includes a pair of side-by-side lids hinged to the cartridge and arranged thereon to be releasably closed over corresponding ones of the lens-holding containers to provide separate enclosed areas for holding the lenses.

4. Apparatus according to claim 3 in which each lens-holding container includes a separate recessed area formed in the body of the cartridge, and in which each lid is arranged to close a separate one of the recessed areas.

5. Apparatus according to claim 4 in which each recessed area is generally spherically shaped.

6. Apparatus according to claim 4 in which the portions of the lids are generally spherically shaped and extend down into corresponding recessed areas for conforming to the general shape of the lenses disposed in the recessed areas.

7. Apparatus according to claim 6 in which each recessed area is generally spherically shaped and matches the general contour of the projecting portions of the lids.

8. Apparatus according to claim 1 including a shoulder formed on the interior of the case for engagement with the seal when the lid is closed.

9. Apparatus according to claim 1 in which the cartridge includes handle means to be located near the top of the carrying case when the cartridge is disposed in the case.

10. Apparatus according to claim 1 in which the cartridge includes guide means on both sides thereof for use in guiding the cartridge into the interior of the case.

11. Apparatus according to claim 1 in which the seal is a flexible ring seal which is removable from a recessed section of the lid.

12. Apparatus of narrow profile for carrying contact lenses which are generally planar in shape, the apparatus comprising
   a fluid-tight carrying case having a hollow interior of elongated cross-sectional configuration defining a long dimension and a short dimension,
   the carrying case having a lid of elongated configuration thereon to provide a closure for the top of the case,
   a lens-carrying cartridge which is separable from the case and from the lid thereof for being removably carried in the hollow interior of the case,
   the cartridge including a pair of side-by-side lens-supporting receptacles for holding a pair of said planar contact lenses submerged in a fluid contained in the case,
   the lens-supporting receptacles being arranged on the cartridge so that lenses contained therein lie in a substantially common plane extending substantially parallel to the long dimension of the case when the cartridge is carried in the case,
   the receptacles being recessed areas formed in the cartridge and having openings thereof for allowing the lenses to be placed in the interior of each recess, and further including receptacle closure means for being releasably closed over the opening to each recess to provide enclosed areas of narrow profile for holding the lenses.

13. Apparatus according to claim 12 in which the receptacle closure means include a pair of side-by-side lids hinged to the cartridge and arranged to be separately releasably closed over corresponding lens-supporting receptacles.

14. Apparatus according to claim 12 in which each recessed area is generally spherically shaped, and portions of the receptacle closure means are generally spherically shaped and extend down into corresponding recessed areas for being spaced from and for matching the general contour of the recessed areas.

15. Apparatus according to claim 12 in which the cartridge includes a generally flat top surface in which the receptacles are recessed, the recessed areas defining separate spaced apart openings in the top surface of the cartridge, and the closure means overlie the top surface of the cartridge to close the openings to the recessed areas.

16. Apparatus according to claim 12 in which the case includes closure means, and a lid of elongated configuration hinged to an end of the case, the lid having an elongated seal and closure means thereon, the seal being arranged to provide a fluid-tight closure for the top of the case when the two closure means of the lid and case are engaged.

17. Apparatus according to claim 16 including a shoulder formed on the interior of the case for engagement with the seal when the lid is closed.

18. Apparatus according to claim 16 in which the seal is a flexible ring seal which is removable from a recessed section of the lid.

19. Apparatus according to claim 12 in which the cartridge includes handle means to be located near the top of the carrying case when the cartridge is carried in the case.

20. Apparatus according to claim 12 in which the cartridge includes guide means on both sides thereof for use in guiding the cartridge into the interior of the case.

21. A cartridge for carrying contact lenses which are generally planar in shape, the cartridge comprising
   a pair of side-by-side lens-supporting receptacles for holding a pair of said planar contact lenses, the receptacles being of narrow profile so the cross-sectional configuration of the cartridge defines a long dimension and a short dimension,
   the lens-supporting receptacles being arranged on the cartridge so that lenses contained therein lie in a substantially common plane extending substantially parallel to the long dimension of the cartridge,
   the receptacles being recessed areas formed in the cartridge and having openings thereof for allowing the lenses to be placed in the interior of each recess, and further including receptacle closure means for being releasably closed over the opening to each recess to provide enclosed areas of narrow profile for holding the lenses.

22. Apparatus according to claim 21 in which the receptacle closure means include a pair of side-by-side lids hinged to the cartridge and arranged to be separately releasably closed over corresponding lens-supporting receptacles.

23. Apparatus according to claim 21 in which each recessed area is generally spherically shaped, and portions of the receptacle closure means are generally spherically shaped and extend down into corresponding recessed areas for being spaced from and for matching the general contour of the recessed areas.

24. Apparatus according to claim 21 in which the cartridge includes a generally flat top surface in which the receptacles are recessed, the recessed areas defining separate spaced apart openings in the top surface of the cartridge, and the closure means overlie the top surface of the cartridge to close the openings to the recessed areas.

* * * * *